No. 699,345. Patented May 6, 1902.
A. J. PROVOST, Jr.
APPARATUS FOR THE TREATMENT OF SEWAGE.
(Application filed Apr. 4, 1901.)
(No Model.)

Witnesses
Inventor
Andrew J. Provost Jr

THE NORRIS PETERS CO., PHOTO-LITHO., WASHINGTON, D. C.

UNITED STATES PATENT OFFICE.

ANDREW J. PROVOST, JR., OF BROOKLYN, NEW YORK.

APPARATUS FOR THE TREATMENT OF SEWAGE.

SPECIFICATION forming part of Letters Patent No. 699,345, dated May 6, 1902.

Application filed April 4, 1901. Serial No. 54,300. (No model.)

*To all whom it may concern:*

Be it known that I, ANDREW J. PROVOST, Jr., a citizen of the United States, residing at 401 Washington avenue, borough of Brooklyn, city of New York, county of Kings, and State of New York, have invented certain new and useful Improvements in Apparatus for the Treatment of Sewage, of which the following is a specification, reference being had to the accompanying drawings, in which—

Figure 1:
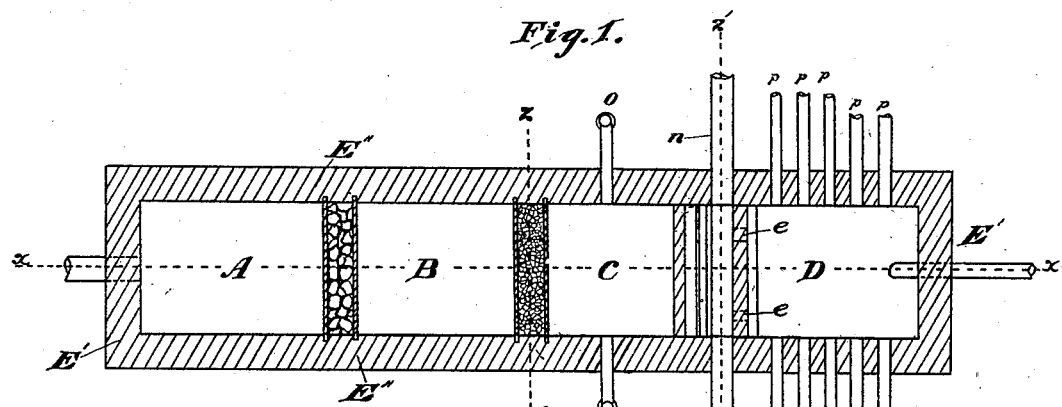
Figure 2:
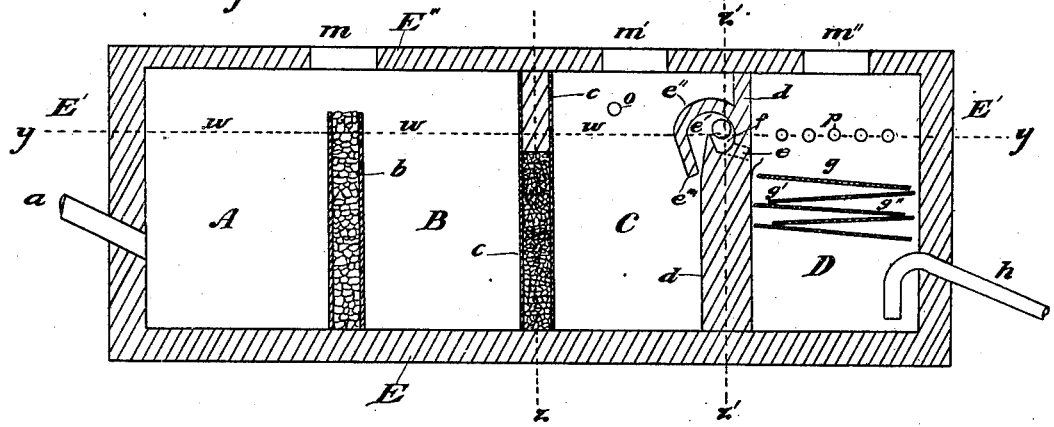
Figure 3:
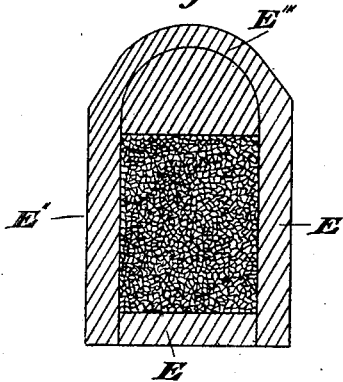
Figure 4:
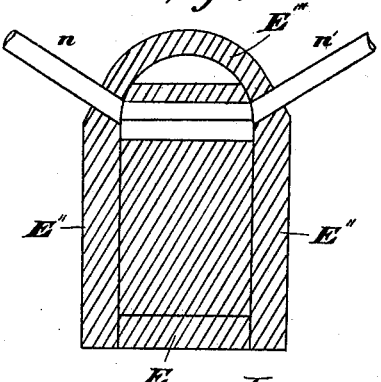

Figure 1 is a horizontal section of my apparatus adapted for the application of my improved treatment, such section being taken on the line $y\ y$ of Fig. 2 and showing in addition the inlet air-pipes $n\ n'$, though same are above the plane of said section. Fig. 2 is a central longitudinal vertical section of the said apparatus, taken on the line $x\ x$ of Fig. 1. Fig. 3 is a transverse vertical section taken on the line $z\ z$ of Figs. 1 and 2. Fig. 4 is a transverse vertical section taken on the line $z'\ z'$ of Figs. 1 and 2.

Similar letters refer to similar parts.

My invention relates to those methods of liquefying and purifying sewage in which the assistance of bacteria is depended upon; and the object of my invention is to provide means and apparatus by which the action of the bacteria upon the sewage is hastened and rendered more efficient and complete than heretofore. With these objects in view I have discovered that the solid carbonaceous and nitrogenous constituents of sewage are most effectively and rapidly broken up and liquefied by the anaerobic bacteria when the larger bodies and particles of these constituents are separated from the smaller and from the general body of the liquid sewage and concentrated by themselves in a more limited volume of such liquid. I have also discovered that the greater part of the finely-divided organic matter suspended in the sewage may be converted into gases and liquids by the anaerobic bacteria when such matter is concentrated up to a certain point in the liquid. I have also discovered that the liquid resultants of the above-described actions are most rapidly and efficiently clarified and divested of any remaining odors by subjecting them to the life processes of other bacteria, which have been named "faculatative," and which require for their propagation and efficiency a limited amount of air.

I accomplish the utilization of my said discoveries for the purposes mentioned by consecutive treatment of the sewage by the use of the novel apparatus which I will now describe.

A B C D are a series of compartments through which the sewage passes during treatment. These compartments may be constructed in any convenient manner, preferably by subdividing a single vault or container having the requisite bottom E, end walls E' E', side walls E'' E'', and top E'''.

The compartments A, B, and C have the same water-level, (indicated by the dotted line $w\ w$, Fig. 2.) The sewage in its natural condition is conducted into the first compartment A through a pipe $a$, the intake of which is wholly below the water-level $w\ w$. This compartment A is, below the water-level, separated from the compartment B by a straining or filtering-partition $b$. This filtering-partition $b$ is constructed in any well-known or convenient manner, its distinguishing characteristic being, however, that the interstercial spaces in the filtering material shall be of such size as to admit the passage therethrough of not only the greater part of the liquid constituents of the sewage which has been introduced into compartment A, but also of the more finely-divided suspended matter contained in such sewage. The partition $b$ should be carried above the water-level of compartments A and B, as shown in Fig. 2. The second compartment B is divided from the third compartment C by the wall $c$, which is constructed, like wall $b$, of filtering material, the interstercial spaces of which are, however, smaller, so as to retain in the compartment B substantially all the solid matters there contained in the sewage. The third compartment C is separated from the fourth compartment D by the impervious partition-wall $d$, having an extended inner superior edge $e'$, disposed transversely of the compartment C, the height of which edge regulates the water-level in all three compartments A, B, and C. The impervious partition $d$ is also provided with an impervious backwardly and downwardly projecting extension $e''$. This extension $e''$ is carried downwardly below the surface of the liquid and terminates in a longitudinally-extended lip $e'''$, disposed, like the edge $e'$, transversely of the compartment C and substantially parallel to the said edge $e'$. Behind the edge $e'$ the partition-wall $d$ is downwardly chambered, so as to provide a longitudinal recess $f$, into which the liquid is received after passing over the edge $e'$. From the chamber $f$ the liquid passes into the fourth compartment D through outlets $e\ e$, where it is intercepted as it falls by a series of broad inclined planes or corrugated surfaces $g\ g'\ g''$, &c., Fig. 2, arranged and supported at an angle to and above each other, as shown in Fig. 2.

$h$ is an outlet-pipe, in this instance in the form of a siphon, for withdrawing the liquid contents of compartment D from time to time as may be requisite.

$m\ m'\ m''$ are manholes, constructed in any convenient manner, through which access may be had when required to the interiors of the respective compartments. The manhole $m$, communicating with compartments A and B, is preferably constructed so as to close airtight. It is also preferable, though not essential, that the manholes $m'\ m''$ should likewise be capable of hermetic closing.

$n\ n'$ are inlet-pipes for the admission of air into the inner chamber of the impervious partition $d$. $o\ o'$ are similar pipes for admitting air as required into the compartment C. $p\ p\ p$ are pipes for admitting air into the compartment D. All these pipes are provided with valves (not shown) and may be connected with any other suitable apparatus whereby the supply of air or the air-pressure in the respective compartments or chambers can be increased as may be required. It will be understood that the compartments A and B are thus hermetically sealed and their contents excluded under normal conditions from access to the air, and the remaining compartments or chambers are arranged so as to contain more or less air, as occasion may require.

By the aid of the above-described apparatus I treat the sewage as follows: The sewage, composed of liquid and solid constituents, the latter being of normal size as received from the sewer, first passes through the intake $a$ into the first compartment A, where it is immediately exposed to the well-understood action of anaerobic bacteria, which attack the solid constituents and proceed to break them up and convert them into liquids; but while this is being done and the larger divisions of the solid matter are retained in the compartment A by reason of their incapacity to pass through the orifices in the filter in the partition $b$ the liquid constituents of the sewage, together with the more finely divided solid matters as originally received and also the smaller divisions of the solid matter produced by the breaking-up action of the anaerobic bacteria, pass immediately through the filter of the partition $b$ into the second compartment B, where the finely-divided solid constituents are detained until completely broken up and converted into liquid and gases by the anaerobic bacterial action. By this means I effect the retention of the larger masses and particles of solid matter in a separate compartment and their separation from the general body of liquid constituents and also from the more finely divided particles of solid matter contained in the latter, and I am thus enabled to increase very greatly the rapidity and efficiency of the action of the anaerobic bacteria upon the solid matter in the sewage. From compartment B the liquid constituents of the sewage, including the liquid produced by the anaerobic action aforesaid, pass into compartment C through the filters in the pervious partition $c$. It will be understood that the liquid referred to as it enters this compartment C is not completely clarified nor yet divested of all odor. I accomplish its substantially complete clarification in the third compartment and also the removal of remaining odors by subjecting the liquid with such particles of solid matter as it may still hold in suspension to the action of the facultative bacteria which enter into this compartment and which there attack the sewage at this step in my process. To obtain the conditions necessary for the application of the life processes of this last-named bacteria to the sewage in this compartment, I introduce therein in any convenient manner—as, for instance, by the use of the inlet-pipes $o\ o'$—limited quantities of air, enough to insure the best and most complete action, the quantity depending in each case upon the quantity of the bacteria and the nature of the particular sewage under treatment, as may be readily determined by experiment in each particular case. From compartment C the liquid constituents pass upward between the impervious partition $d$ and its downwardly-projecting lip $e'''$ and over the edge $e'$ into the recess-chamber $f$, where they are still further exposed to air introduced through the pipes $n\ n'$ under either atmospheric or increased pressure. From the recess-chamber $f$ the liquids pass through the outlets $e\ e$ into the final chamber D, in which they pour out upon the inclined planes or corrugated surfaces $g\ g'$, &c., and are thus spread out into films, so as to present the most complete exposure thereof possible to the air which is introduced or forced into the compartment D through the inlets $p\ p$, and in this compartment, which is provided with aerobic bacteria, they are subjected to the action of bacteria in the manner well understood. Finally the liquids are withdrawn from the compartment D through any suitable outlet—as, for instance, a siphon $h$.

It will be observed that the novel features of construction which I have embodied in the impervious partition $d$ result in securing an outtake of the liquids in the compartment C from a location considerably below the level of the liquids in compartments A, B, and C, but that such water-level is maintained throughout the three compartments by the edge $e'$ of said partition $d$. By this means I am enabled to maintain a stationary level in each and all of the said compartments, which is greatly to the advantage of the development and action of the contained bacteria, inasmuch as the floating bacterial masses are thereby maintained during all stages of the operation in an undisturbed condition and not subject to injurious movement due to fluctuation in the water-level. It will also be observed that one of the special novel advantages secured by my backwardly and downwardly projecting longitudinal lip $e'''$ consists in its operating as a substantially perfect check or barrier against back drafts of air from the compartment D, which might otherwise enter into the compartment C to an extent sufficient to disturb the proper development and action of the faculatative bacteria.

It will be understood that without departing from my invention the respective dimensions and proportions of the different parts of my apparatus as described and shown in my drawings may be varied as occasion may require; also, that the partition $c$ may be inclined at an angle or even placed horizontally, so as to divide the compartment B from the compartment C, the location of the said wall in such modified position being retained in such relation to the liquid contents of the compartment B as to insure their passing through the filter in said wall.

I am aware that sewage has been treated before my invention by subjecting the same to the action of anaerobic bacteria in air-tight compartments and the resultants to further action by anaerobic bacteria on exposure to air, and I do not intend to be understood as claiming any such processes as constituting any part of my present invention.

What I claim as new, and desire to secure by Letters Patent, is the following, viz:

1. In an apparatus for purifying sewage by bacterial action the combination of a first compartment for the reception of the sewage from the sewer and adapted to anaerobic bacterial growths, a second compartment likewise adapted and a pervious partition between said compartments, adapted to detain in the first compartment a given size of solid constituents of the sewage and to pass into the second compartment such solid constituents of lesser size, substantially as and for the purposes described.

2. In an apparatus for purifying sewage by bacterial action the combination of a compartment adapted to the growth and action of anaerobic bacteria a second compartment adapted to the growth and action of faculatative bacteria and a filtering-partition between the said compartments, substantially as and for the purposes described.

3. In an apparatus for purifying sewage by bacterial action the combination of a compartment adapted to the growth and action of anaerobic bacteria and to the reception and partial detention of the sewage from the sewer, a second compartment likewise adapted to the growth and action of anaerobic bacteria, a filter connecting said two compartments and adapted to resist the passage of a certain size of particles of the solid constituents of the sewage and to permit the passage of all smaller sizes, a third compartment adapted to the growth and action of faculatative bacteria and a filter connecting said last-mentioned compartment with the aforesaid second compartment and adapted to detain substantially all solid constituents in said second compartment, substantially as and for the purposes described.

4. In an apparatus for purifying sewage by bacterial action the combination of a compartment adapted to the growth and action of anaerobic bacteria and to the reception and partial detention of the sewage from the sewer, a second compartment likewise adapted to the growth and action of anaerobic bacteria, a filter connecting said two compartments and adapted to resist the passage of a certain size of particles of the solid constituents of the sewage and to permit the passage of all smaller sizes, a third compartment adapted to the growth and action of faculatative bacteria and a filter connecting said last-mentioned compartment with the aforesaid second compartment and adapted to detain substantially all solid constituents in said second compartment and a fourth compartment connected with said last-mentioned third compartment and adapted to the growth and action of aerobic bacteria, substantially as and for the purposes described.

5. In an apparatus for the purification of sewage by bacterial action a series of three successively-interconnecting compartments having the same water-level, the first adapted to the action and growth of anaerobic bacteria and to the reception of the sewage from the sewer, the second likewise adapted to the growth and action of anaerobic bacteria and communicating with the first through a filter adapted to detain in the latter a certain size of particles of the solid constituents of the sewage and to admit passage into the latter with the liquid constituents of all smaller-sized particles of said solid constituents, the third compartment adapted to the growth and action of faculatative bacteria and connected with the second compartment through a filter adapted to retain in the latter substantially all its contained solid constituents of the sewage, substantially as and for the purposes described.

6. In an apparatus for purifying sewage by bacterial action and containing a plurality of interconnecting compartments adapted to successive stages of treatment of such sewage a final retaining wall or dam having a horizontally-extended upper edge determining the level of the liquid in all of said compartments and in combination therewith an inwardly and downwardly extending and correspondingly horizontally extended projection forming a hood for said upper edge and projected downwardly beneath the surface of the liquid, substantially as and for the purposes described.

7. In an apparatus for purifying sewage by bacterial action and consisting of one or more compartments adapted to temporarily detain the sewage a partition or wall having a horizontally and longitudinally extended inner chamber provided with outlets an upper edge correspondingly longitudinally and horizontally extended above the bottom of such chamber and fixing the level of the liquid in such compartment or compartments and an inwardly and downwardly and correspondingly horizontally and longitudinally extended projection covering said chamber and said edge and projecting downwardly into the liquid below its said level substantially as and for the purposes described.

8. In an apparatus for purifying sewage by bacterial action and consisting of one or more compartments adapted to temporarily detain the sewage a partition or wall having a horizontally and longitudinally extended inner chamber provided with outlets an upper edge correspondingly longitudinally and horizontally extended above the bottom of such chamber and fixing the level of the liquid in such compartment or compartments and an inwardly and downwardly and correspondingly horizontally and longitudinally extended projection covering said chamber and said edge and projecting downwardly into the liquid below its said level, a partition or wall $d$ containing a longitudinally-extended and horizontally-extended inner chamber $f$ having outlets $c$ a correspondingly horizontally and longitudinally extended upper edge $e'$ and over the said chamber and edge an inwardly and downwardly projecting and correspondingly horizontally and longitudinally extended projection or hood $e''$ having a lower edge or lip $e'''$ below the level of the liquid, substantially as and for the purposes described.

ANDREW J. PROVOST, Jr.

Witnesses:
PHILIP C. PECK,
JOHN R. PAXTON, Jr.